Nov. 12, 1968    G. E. CONKLIN    3,410,628
GAS LENS USING TWO GASES HAVING UNEQUAL REFRACTIVE INDICES
Filed Sept. 21, 1964    3 Sheets-Sheet 1
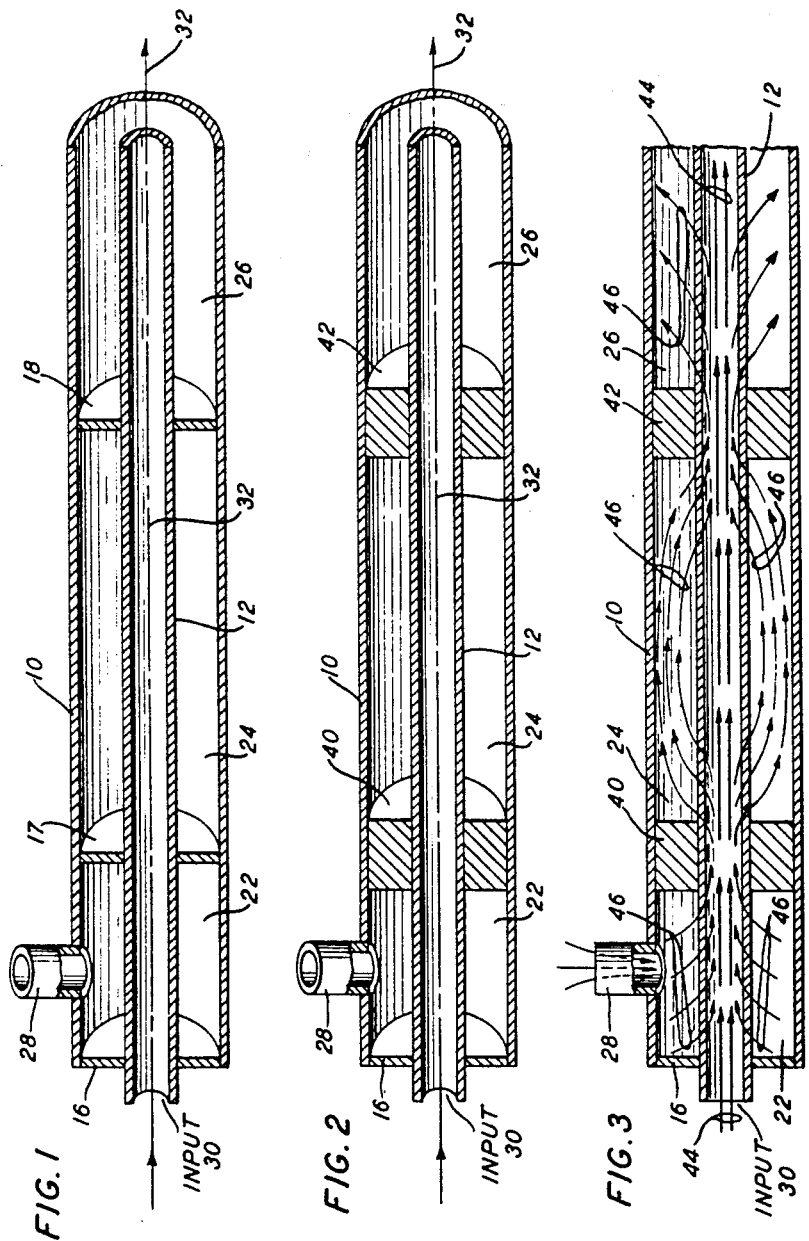
INVENTOR
G.E. CONKLIN
BY H. O. Wright
ATTORNEY Nov. 12, 1968    G. E. CONKLIN    3,410,628
GAS LENS USING TWO GASES HAVING UNEQUAL REFRACTIVE INDICES
Filed Sept. 21, 1964    3 Sheets-Sheet 2

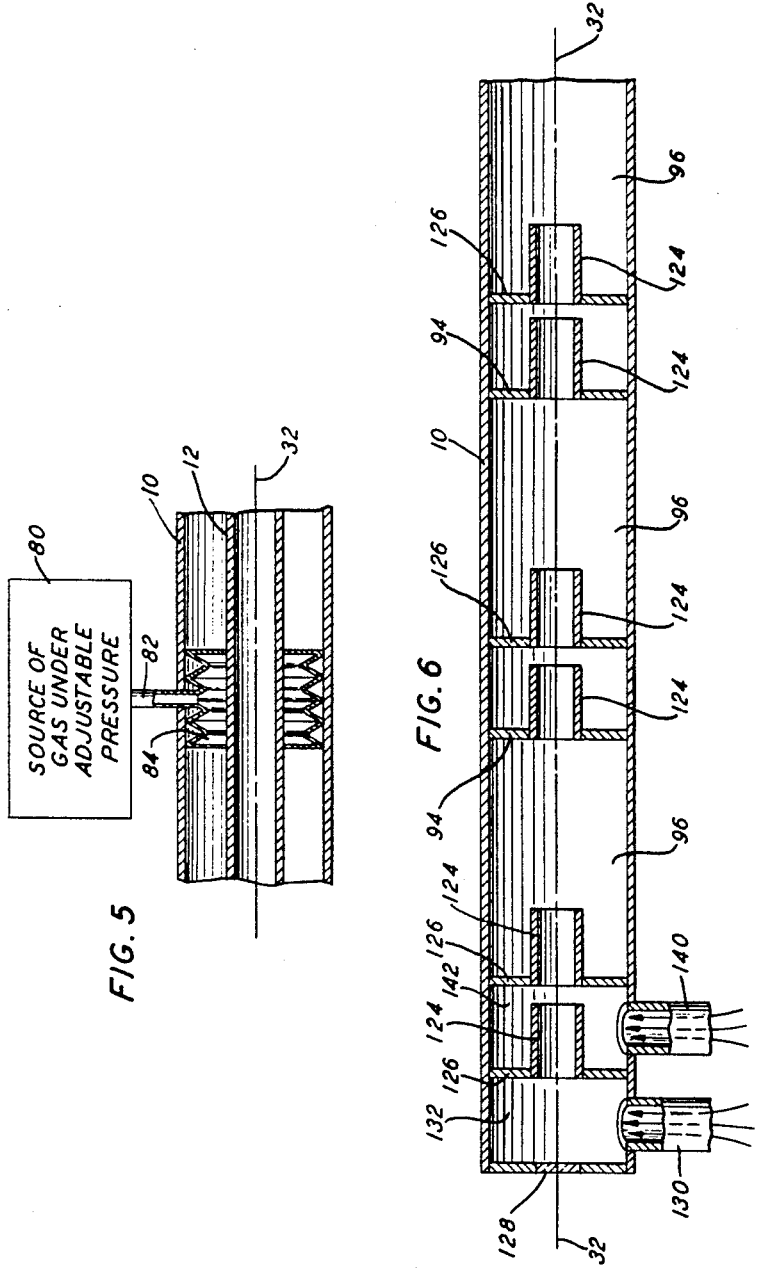

3,410,628
GAS LENS USING TWO GASES HAVING UNEQUAL REFRACTIVE INDICES
Glenn E. Conklin, Middletown, N.J., assignor to Bell Telephone Laboratories, Incorporated, New York, N.Y., a corporation of New York
Filed Sept. 21, 1964, Ser. No. 397,678
7 Claims. (Cl. 350—179)

ABSTRACT OF THE DISCLOSURE

In a two-gas gaseous lens, the two gases become mixed after traveling a relatively short distance along the wavepath. Once mixed, they no longer produce the desired focusing effect upon the wave energy being guided. In accordance with the invention, an arrangement of porous and impervious means are longitudinally distributed along the wavepath for continuously separating the mixed gases and then recombining them in a manner to produce focusing. In one embodiment, two coaxial conduits are employed in which the inner conduit is porous to gases of small refractive indices, but impervious to gases of high refractive indices. As a result, the mixed gases flowing within the inner conduit tend to separate, with the large refractive index gas remaining within the inner conduit and the small refractive index gas diffuses into the region between conduits. The latter gas is then forced back into the outer lamina of the large refractive index gas by means of impervious barriers placed between the two conduits. In a second embodiment, a single conduit is used along with pairs of porous and impervious barriers to achieve the same result.

---

This invention relates to the long distance transmission of a beam of ultrahigh frequency electromagnetic waves through an enclosing conduit. More particularly, it relates to improved arrangements for minimizing beam spreading and ray scattering in connection with the long distance transmission of such a beam.

The following copending applications, all assigned to applicant's asignee, describe and claim related arrangements directed to substantially the same or similar objects as the present application.

These copending applications are: D. W. Berreman, Ser. No. 347,166, filed Feb. 25, 1964; D. W. Berreman, Ser. No. 353,689, filed Mar. 23, 1964; D. W. Berreman, Ser. No. 372,992, filed June 5, 1964; D. W. Berreman-S. E. Miller, Ser. No. 379,175, filed June 30, 1964; A. C. Beck-G. E. Conklin-A. R. Hutson, Ser. No. 379,112, filed June 30, 1964; E. A. J. Marcatili, Ser. No. 382,873, filed July 15, 1964; J. R. Whinnery, Ser. No. 384,510, filed July 22, 1964; D. W. Berreman, Ser. No. 385,739, filed July 28, 1964.

In my above-mentioned, copending, joint application with A. C. Beck and A. R. Hutson, focusing arrangements are described wherein a laminar flow of a first transparent gas of a first refractive index is maintained in a pipe or conduit through the center of which a path for the transmission of an ultrahigh frequency electromagnetic wave beam is provided. In one arrangement of the said joint application, sections of the pipe at intervals along it are made of porous material and a second transparent gas of a second refractive index, differing substantially from the refractive index of the first gas, is introduced through the porous sections. Thus a transverse radial gradient of the refractive index is established at intervals along the pipe since the second gas introduced around the peripheral surface of the conduit tends to diffuse slowly toward the more centrally located laminas of the laminar flow of the first gas along the conduit. If the refractive index of the introduced gas is smaller than that of the gas flowing along the conduit, a converging focusing effect results. If the refractive index of the introduced gas is larger than that of the flowing gas, a diverging focusing effect results.

A difficulty with such arrangements arises in view of the intermingling of the gases after traveling through a relatively short length of the tube or conduit so that the difference in refractive index between the gas introduced at succeeding porous sections and the mixed gas flowing in the tube is reduced and the focusing effect correspondingly decreased. Since it is contemplated that conduits hundreds of miles in length will be employed as the systems of this type are intended to interconnect widely separated major cities such, for example, as New York and Chicago, it is apparent that at numerous points along such a long conduit it will be necessary to remove the mixed gases and launch a fresh flow of gases in the conduit.

The present invention proposes to reduce the above described difficulty, in a first illustrative embodiment of the invention, by employing a first central conduit in which a first transparent gas flowing along the conduit is relatively "heavy" and/or of large refractive index, the conduit being of a material which is substantially impervious to this first gas while at the same time being substantially porous to a lighter gas of small refractive index. As for my above-mentioned joint application, the flow of the first gas in the central conduit is adjusted to be of a laminar character, any turbulence being carefully avoided.

Furthermore, in said first illustrative embodiment of the present application, a second pipe or conduit impervious to all gases and having a diameter several times that of the first is concentrically arranged to enclose the first conduit. The second conduit of this first embodiment is provided with barrier members also impervious to all gases. These barrier members are provided at the ends of the larger conduit and are also spaced at intervals along the larger conduit. The barrier members extend from the interior periphery of the second or larger conduit to the exterior of the first or small inner conduit to effectively prevent a direct uninterrupted flow of gas along the second or larger conduit.

This first embodiment or arrangement obviously provides a continuous sequence of annular chambers spaced along and surrounding the inner conduit but separated from each other by barrier members impervious to the gases employed in the system.

The rate of flow of the heavier or larger refractive index gas in the smaller inner conduit is adjusted so that an appreciable pressure drop will occur in the distance of an interval between the successive barrier members in the outer conduit.

A lighter, transparent, low refractive index gas to which the smaller central conduit is substantially porous is then introduced into the first of the above-mentioned annular chambers. This gas passes through the walls of the inner conduit and diffuses into the outer laminas of the flow of gas in the inner conduit producing a transverse radial gradient of the refractive index of the gas from a maximum on the axis to a minimum at the periphery of the inner conduit in substantially the same manner as for a comparable form of the above described arrangement of my copending joint application. However, in the arrangement of the present application, as soon as the flow of the combined gases passes a barrier, the lighter gas, in view of the pressure drop between successive barriers resulting from the flow of the larger refractive index gas through the central conduit, tends to leave the outer laminas of the flow in the center conduit and enter the second annular chamber surrounding it. The lighter gas then proceeds in the second annular chamber toward the next barrier, re-entering, as it approaches the barrier, the flow of gas in the central conduit to pass around the barrier and in similar manner to leave the flow and enter the third annular chamber after passing the barrier, the process being repeated at each succeeding barrier and annular chamber along the length of the transmission system.

Focusing action will thus be induced in the central conduit in the vicinity of each barrier but diffusion of the lighter gas into the more central laminas of the flow of heavier gas in the central conduit will be substantially decreased as compared with the arrangements of my above-mentioned copending joint application. The effective length and the focusing effect of any individual gaseous lens thus produced can obviously be increased by increasing the width (along the axis of the conduit) of the barrier member associated with the lens. In situations where it may be necessary to introduce bends or curves in the conduit structure, greater focusing effect and/or closer spacing of successive gaseous lenses may be required to effect corresponding changes in the direction of the beam being transmitted along the axis of the structure. A barrier of adjustable width can be employed to permit adjustment of the focusing strength of an associated gaseous lens.

The above described arrangement of the conduits and barriers results in general in the presence in the central conduit of a gas mixture having a preponderance of the gas of larger refractive index and in the sequence of annular chambers of a gas mixture having a preponderance of the gas of smaller refractive index.

Another embodiment employing porous barriers in a somewhat different manner will also be described in detail hereinunder and, as will become apparent from perusal of the descriptive matter, its mode of operation also involves the concept of periodically effecting to an appreciable degree a separation of the smaller index gas from the larger index gas at frequent intervals along the transmission system coupled with the re-introduction of the lighter gas thus separated into the outer laminas of the flow of gas along the axis of the conduit.

A principal object of the invention, accordingly, is to reduce difficulties arising from the complete diffusion of the gas of smaller refractive index into the gas of larger refractive index in long distance transmission systems employing conduits in which gaseous lens arrangements are included which involve the use of a combination of such gases.

Other objects, features and advantages of the invention will become apparent from a perusal of the following detailed description of illustrative structures of the invention and from the appended claims taken in conjunction with the accompanying drawing, in which:

FIG. 1 illustrates, in a longitudinal cross-sectional showing, a first structure operating in accordance with the principles of the invention;

FIG. 2 illustrates a second structure closely related to that of FIG. 1;

FIG. 3 is a gas flow diagram employed in explaining the operation of structures of FIGS. 1 and 2;

FIG. 5 illustrates a type of barrier the width of which can be adjusted; and

FIG. 6 illustrates in a longitudinal cross-sectional showing a third structure operating in accordance with certain principles of the invention.

Figure 4:
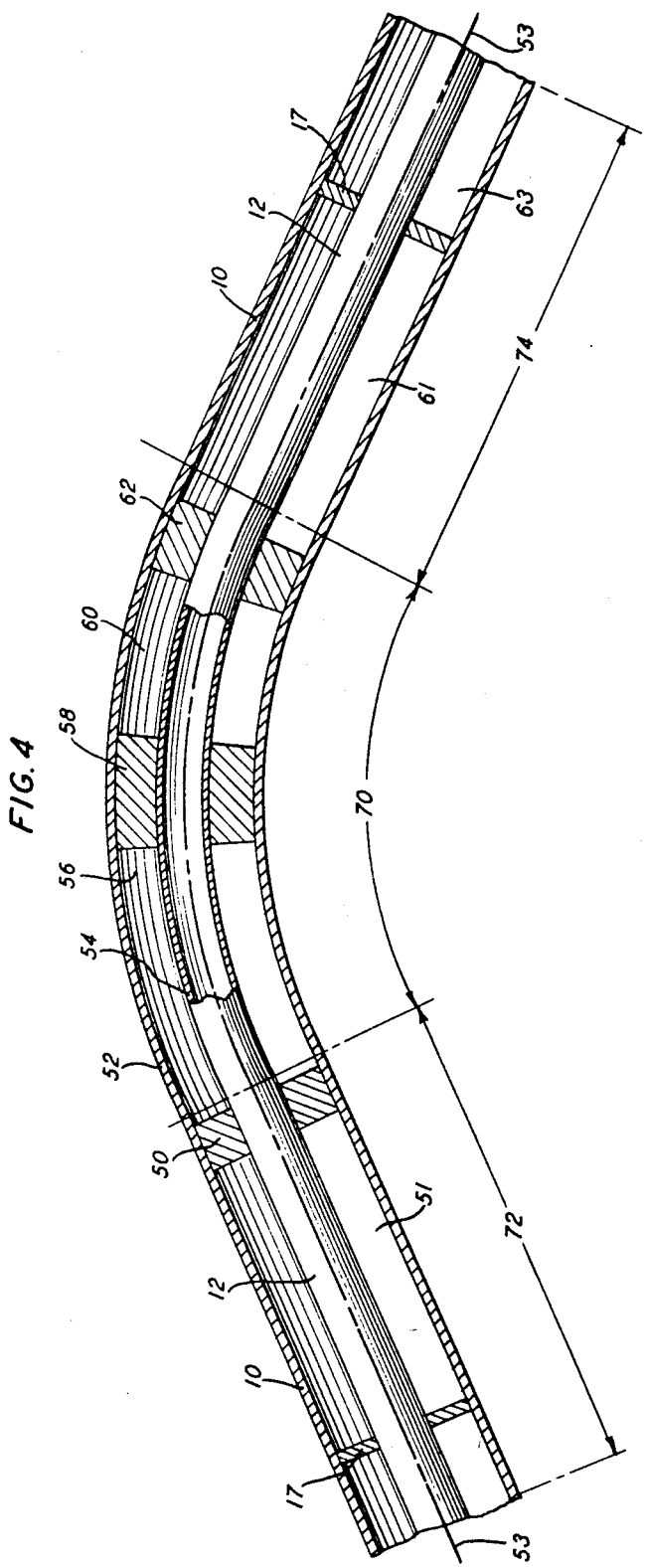
FIG. 4 illustrates the application of certain principles of the invention to a length of conduit which includes a curved portion.

In more detail in FIG. 1, a central conduit 12 provides a path substantially centered about its longitudinal axis 32 for the free passage of a beam of ultrahigh frequency electromagnetic wave energy.

Conduit 12 is enclosed longitudinally by a second concentrically arranged conduit 10 having a diameter several times that of conduit 12.

A plurality of partitioning or barrier members such as members 17 and 18 and an end closure or barrier member 16 at each end of conduit 10, the far end, for obvious reasons, not being shown, are positioned at intervals along the structure and subdivide the space between conduits 10 and 12 into a series or sequence of annular chambers such as 22, 24, 26, and the like.

As mentioned above, structures of the invention are to serve as the transmission media between widely separated terminal stations. At relatively long intervals it may, accordingly, be desirable to arrange for the withdrawal and reconditioning of the gases employed and the introduction of fresh or reconditioned gases. Those skilled in the art can, it is believed, readily devise structures of substantially conventional types to effect these changes. As mentioned hereinabove, a principal object of the present invention is to increase the length of the intervals at which fresh or reconditioned gases must be supplied.

Conduit 10 and members 16, 17 and 18, et cetera, are of a material impervious to substantially all gases and may be of metal, plastic or the like. Conduit 12 is of a consolidated material which is substantially porous to a number of lighter gases of small refractive indices such as helium, hydrogen, neon, argon, and the like, but to a considerable degree impervious to heavier gases of larger refractive indices such as carbon dioxide, methane and the like. More specifically, conduit 12 should be of a permeable material of sufficiently high "surface area" that the diffusive component of fluid flow predominates over the viscous component. The effective "surface area" of a permeable object such, for example, as a disc is not the surface area enclosing the disc but rather the total area of all the pores in the interior of the disc. The effective "surface area" in such cases is expressed in terms of surface area per unit of weight or volume. Suitable consolidated porous media include sintered metals, sintered glass, unglazed ceramic bodies, various porous plastics and Alundum. The majority of the above materials are formed by consolidating small particles. In another class of suitable materials the pore space is formed mainly by removing or dissolving out part of the solid originally present, as for example in the case of "Vycor" porous glass.

An input port 28 is provided in the first or end annular chamber 22 for the introduction of a transparent gas of small refractive index. A transparent gas of large refractive index is introduced into an end of conduit 12 as, for example, from the left end 30 of the conduit. A substantial flow of the larger index gas is maintained through conduit 12 by any conventional means (not shown) such, for example, as a blower, compressor or the like, substantially as discussed for the arrangements proposed in my above-mentioned copending joint application. The flow of the larger index gas should be laminar in character, that is, free from turbulence, but sufficient to develop an appreciable pressure difference along conduit 12 in the normal minimum interval between successive barriers such as barriers 17 and 18.

A sufficient quantity of the smaller index gas is injected through port 28 at an appropriate pressure such that an appreciable quantity of the smaller index gas will pass through central conduit 12 from chamber 22 and diffuse into the outermost laminas of the flow of the larger index gas.

As soon as the flow of larger index gas with the smaller index gas in its outermost laminas passes the barrier 17 (because of the pressure drop in the flow of larger index gas between successive barriers), an appreciable portion of the smaller index gas will be drawn from the outer laminas of the flow in conduit 12 into cavity 24 through conduit 12 and will travel in cavity 24 toward its right end where it will again pass through conduit 12 and again enter the outer laminas of the flow of gas in conduit 12 until the second barrier 18 has been passed. This process continues throughout the length of the structure so that only a relatively small amount of the smaller index gas is "lost" by diffusion into the more centrally positioned laminas of the larger index gas flowing through conduit 12.

Nonetheless, in the vicinity of each barrier an appreciable amount of the smaller index gas will be present in the outer laminas of the flow of gas through conduit 12 and will produce a refractive index varying radially from a maximum value on the axis to a minimum value at the inner surface of conduit 12. This variation produces a convergent focusing effect on the beam when the latter is transmitted substantially along the axial path 32 through conduit 12.

By increasing the thickness of the barriers as illustrated in FIG. 2 for barriers 40 and 42, the effective length of the gas lens in the vicinity of each barrier is correspondingly increased and the degree or strength of the focusing effect is likewise increased. Alternatively, an impermeable collar or section of conduit 12 could obviously be added following a thin barrier member to produce substantially the same effect as the thicker barriers illustrated in FIG. 2. The degree of focusing is, of course, also dependent upon the difference between the refractive indices of the smaller index and larger index gases employed and increases with increased pressure and/or temperature of the gases.

In FIG. 3 the flows of the smaller index and larger index gases of the arrangements of FIGS. 1 and 2 of the invention are indicated. The heavy arrows 44 represent the straight-through flow of the larger index gas in conduit 12 while the lighter arrows 46 represent the flow of the smaller index gas as it passes around each successive barrier from the preceding to the next successive annular chamber, that is, from chamber 22 to 24, and from chamber 24 to 26, et cetera.

In FIG. 4 a length of the double conduit structure of the invention, as shown in FIG. 1, is illustrated which includes a curved portion 70, having inner conduit 54, outer conduit 52 and annular chambers 56 and 60, interconnecting straight portions 72 and 74 to effect a change in direction of the over-all structure. The longitudinal axis 53 indicates substantially the path which the beam is intended to follow through the over-all length illustrated.

In the straight portions 72 and 74, relatively thin barrier members 17 suffice to induce adequate focusing of the beam but as the curved portion 70 is approached a thicker barrier 50 is employed. Within the curved portion 70 other thicker barriers 58 and 62 are employed to induce the stronger focusing action necessary if the beam is to substantially follow the curved portion of the axis 53.

While in general appreciable changes in direction of the over-all structure should be effected by portions having the largest feasible radii, the use of more barriers with shorter intervals between barriers may in appropriate instances be combined with the use of thicker barrier members to effect the necessary changes in the direction of the beam.

In FIG. 5 a barrier member 84 of the "bellows" or "accordian" type is illustrated as one form of variable or adjustable width barrier. It is of the familiar "pleated" type and has an input tube 82 through which it is connected to a source 80 of gas of controllable pressure. If the gas pressure of source 80 is increased, the member 84 expands in a direction parallel to the common axis 32 of outer conduit 10 and inner conduit 12. If the gas pressure of source 80 is decreased, the member 84 contracts in the opposite direction. As pointed out hereinabove in connection with FIGS. 1, 2 and 4, changing the width of the barrier member results in a comparable change in the length and consequently in the focusing effect of the gaseous lens formed by the arrangements of the invention. The use of variable width barriers will therefore obviously also permit adjustment of the focusing effects of the gaseous lenses established by arrangements of the invention.

A further arrangement or species of the invention is illustrated diagrammatically in FIG. 6 which requires no smaller diameter, centrally located, continuous, porous conduit such as conduit 12 of FIGS. 1, 2, etc.

At the left end of the structure of FIG. 6 a first chamber 132 having an input port 130 and a second chamber 142 having an input port 140 are provided for introducing a gas of larger refractive index and a gas of smaller refractive index, respectively. A transparent window 128, to permit free transmission of a laser beam or the like along axis 32, is provided in the left wall of channel 132 centered about axis 32. Chamber 142 is formed between two barrier members 126 impervious to both gases, each barrier supporting a short tubular member 124 concentrically about axis 32 and extending to the right of its supporting barrier in each instance, as shown. Tubular members 124 are, as shown, of relatively small diameter and are also impervious to both gases. There is a small gap between the right end of the first tubular member 124 and the barrier member 126 to its right, as shown.

At intervals to the right along conduit 10 of the system a sub-structure comprising a porous barrier 94 which extends between the outer conduit 10 and the left end of another of the short cylindrical members 124 and, a short distance to the right of the last-mentioned member 124, another barrier member 126 (impervious to all gases) which supports the left end of still another member 124, extending to the right of barrier 126. Both of the last-mentioned members 124 for each successive sub-structure are also concentrically supported by their respective associated barrier members about axis 32.

For operation of the system, a sufficient quantity of a first gas having a large index of refraction is introduced into chamber 132 through port 130 to produce a laminar flow of gas through the members 124 distributed along the system and to establish an appreciable pressure at each successive porous barrier 94 along the system. A second gas having an index of refraction appreciably smaller than that of the first gas is introduced into chamber 142 through port 140 of sufficient volume and pressure that a suitable quantity of the lower index gas will diffuse into the outer laminas of the laminar flow of the said first gas through the gap between the first member 124 and on through the second member 124, thus producing a radially varying gradient of the refractive index of the combined gases passing through the second member 124, and for a short distance to the right of the second member 124, the refractive index being a maximum on axis 32 and decreasing radially to the inner periphery of the said second member 124.

Accordingly a laser beam, or the like, transmitted along a path substantially concentric with the axis 32 will be subjected to a convergent focusing effect in passing through said second member 124.

Upon emerging from the right end of said second member 124 into annular chamber 96 the two gases will tend by diffusion to become intermingled within a short distance beyond the end of the second member 124, so that at the first and each subsequent porous barrier 94 a large proportion of the gas of smaller index of refraction in the mixture will pass through barrier 94 but an insignificant amount of gas of larger index of refraction will do so.

Thus a major portion of the gas of larger index of refraction accompanied by only a small amount of gas of smaller index of refraction will pass through the first member 124 of each sub-structure and thence through the second member 124 of the sub-structure.

The chamber or cavity between barriers 94 and 126 of each sub-structure will therefore be filled mainly by gas of the smaller index of refraction which will be drawn, through the gap between the first member 124 and barrier 126, into the outer laminas of the laminar flow of the gas of larger refractive index through the second member 124. This will, of course, produce a radial gradient of the refractive index across the second member 124 (and for a short interval to the right of the second member 124) from a maximum on axis 32 and decreasing radially therefrom.

Accordingly, a light, laser, or other ultrahigh frequency electromagnetic wave beam being transmitted along axis 32 will also be subjected to a convergent focusing effect at each sub-structure in turn along the system.

In the interval in conduit 10, i.e., in annular chamber 96, before the next porous barrier 94 is reached, the two gases will again become intermingled and the process above described will, as mentioned above, be repeated in passing through each successive sub-structure comprising a pair of barriers 94, 126, with their associated pair of members 124.

The above described specific embodiments are, obviously based upon the common concept of periodically separating a substantial portion of the gas of lower refractive index from the flow of a mixture of the two gases along the system and reintroducing the separated gas in such manner as to foster its entrance into the outer laminas of the flow of gas along the axis of the system to produce, at intervals, regions in which the above described radially varying gradients of the refractive index of the gas mixture are established.

Numerous and varied modifications and rearrangements of the above described illustrative embodiments within the spirit and scope of the principles of the invention will readily occur to those skilled in the art. Accordingly, the embodiments disclosed are to be understood as being illustrative but in no way limiting the scope of the invention.

What is claimed is:

1. In a system for guiding a beam of ultrahigh frequency electromagnetic wave energy:
   a hollow, elongated conduit, providing an enclosure for the transmission of said beam, within which a substantially laminar flow of a first transparent gas, having a first refractive index, is established;
   means for introducing into said system a second transparent gas, having a second refractive index different from said first refractive index;
   means, porous to one of said gases and impervious to the other of said gases, longitudinally distributed along said circuit for substantially separating said gases from a mixture of said two gases;
   and means including a plurality of barriers, impervious to both said gases, longitudinally distributed along said conduit, for forcing said second gas into the outer laminar of said first flowing gas, whereby a radial gradient in the refractive index is periodically established across the path of said beam.

2. A structure for establishing a succession of gaseous lenses at intervals along a transmission path comprising:
   an inner conduit, providing an enclosure for the transmission of ultrahigh frequency wave energy;
   an outer conduit, coaxially aligned with said inner conduit;
   and a plurality of transverse barriers, extending between said inner and outer conduits, longitudinally spaced at intervals along said structure;
   a source of transparent gas of high refractive index connected at one end of said structure for causing a laminar flow of said gas along said inner conduit;
   a source of transparent gas of lower refractive index connected at said same end for introducing said lower refractive index gas into said outer conduit;
   characterized in that:
   said outer conduit and said barriers are impervious to both said gases;
   and in that said inner conduit is porous to said lower refractive index gas but is impervious to said higher refractive index gas.

3. A structure adapted for focusing a beam of ultrahigh frequency electromagnetic wave energy comprising:
   a hollow, elongated conduit impervious to all gases;
   first and second short, cylindrical members, impervious to all gases, concentrically supported within said conduit and longitudinally spaced end to end with a short interval between them;
   a first barrier extending between said conduit and said first cylindrical member at the end of said first cylindrical member farther from said second cylindrical member;
   said first barrier being substantially porous to transparent gases having small refractive indices and substantially impervious to gases having large refractive indices;
   a second barrier member extending between said conduit and said second cylindrical member at the end thereof adjacent to said first cylindrical member to form an annular space between said first and second barriers;
   said second barrier being impervious to all gases such that when a flow of gases comprising a mixture of a gas of small refractive index and a gas of large refractive index impinges upon said first barrier, the gas of large refractive index mainly passes through said first cylindrical member and into and through said second cylindrical member, whereas a large portion of the gas of small refractive index passes through said first barrier and into the annular space between said barriers from whence it passes through said gap between said two cylindrical members and into the outer laminas of the flow of gas entering said second cylindrical member;
   said flow of gases forming, in said second cylinder, a gas mixture whose refractive index varies radially from a maximum at the axis of said second cylindrical member to a minimum at the inner periphery of said second cylindrical member.

4. The structure of claim 2 in which the gas of high refractive index is carbon dioxide and the gas of lower refractive index is helium.

5. The structure of claim 2 in which the gas of high refractive index is methane and the gas of lower refractive index is argon.

6. The structure of claim 2 in which the widths of the transverse barriers in the direction of the longitudinal axis are all alike.

7. The structure of claim 2 in which the widths of some of the transverse barriers in the direction of the longitudinal axis differ from those of other barriers.

References Cited

Beck: "Gas Mixture Lens Measurements," The Bell System Technical Journal, vol. XLIII, No. 4, part 2, July 1964, pp. 1821–1825.

JOHN K. CORBIN, *Primary Examiner.*